United States Patent

Kawasaki et al.

[11] Patent Number: 5,958,069
[45] Date of Patent: Sep. 28, 1999

[54] APPARATUS FOR PREVENTING MALFUNCTION AT TIME OF DUPLEX UNIT FAILURE

[75] Inventors: Hiroya Kawasaki; Masaki Kira; Shiro Uriu, all of Kawasaki; Yukinaga Toyoda; Kazumasa Sonoda, both of Fukuoka, all of Japan

[73] Assignee: Fujitsu Limited, Kanagawa, Japan

[21] Appl. No.: 08/854,741

[22] Filed: May 12, 1997

[30] Foreign Application Priority Data

Nov. 19, 1996 [JP] Japan .................................. 8-307595

[51] Int. Cl.⁶ ....................................................... G06F 11/16
[52] U.S. Cl. ................................. 714/11; 714/2; 714/13; 714/22; 714/48
[58] Field of Search ............................. 395/181, 182.01, 395/182.08, 182.09, 182.11, 182.12, 182.2, 185.01, 750.08, 182.04, 182.19, 182.21, 183.06, 200.38, 200.39; 364/185, 200; 340/147, 172.5, 507

[56] References Cited

U.S. PATENT DOCUMENTS

| 3,757,302 | 9/1973 | Pollitt ....................................... 340/147 |
| 3,860,914 | 1/1975 | Zitelli et al. .......................... 340/172.5 |
| 4,455,601 | 6/1984 | Griscom et al. ........................ 364/200 |
| 5,504,859 | 4/1996 | Gustafson et al. .................. 395/182.09 |
| 5,544,304 | 8/1996 | Carlson et al. ..................... 395/182.08 |

FOREIGN PATENT DOCUMENTS

| 60-174535 | 9/1985 | Japan ............................... H04B 1/74 |
| 6-199154 | 7/1994 | Japan ............................... B60K 4/00 |

*Primary Examiner*—Robert W. Beausoliel, Jr.
*Assistant Examiner*—Andy Nguyen
*Attorney, Agent, or Firm*—Helfgott & Karas, PC.

[57] ABSTRACT

A system includes a host, first and second devices which operate as an acting device and a standby device, and a simplex unit controlled by the acting device. Each device is provided with a monitoring unit for monitoring the occurrence of failure, means for notifying the other device of a failure in its own device, and active/standby notification means. The active/standby notification means notifies the simplex unit that its own device is acting or standing by when the device becomes the acting device or standby device in response to a command from the host. Upon a failure in the other device when its own device is standing by, the active/standby notification means notifies the simplex unit that its own device is now an apparent acting device. Upon a failure in its own device when its own device is acting, the active/standby notification means notifies the simplex unit that its own device is now an apparent standby device. The simplex unit executes predetermined control upon accepting control data from the apparent acting device.

7 Claims, 6 Drawing Sheets

FIG.6 PRIOR ART

APPARATUS FOR PREVENTING MALFUNCTION AT TIME OF DUPLEX UNIT FAILURE

BACKGROUND OF THE INVENTION

This invention relates to an apparatus for preventing malfunction when a failure occurs in a duplex unit. More particularly, the invention relates to an apparatus for preventing malfunction at failure in a system which controls a subordinate simplex unit by an acting device.

Figure 6:
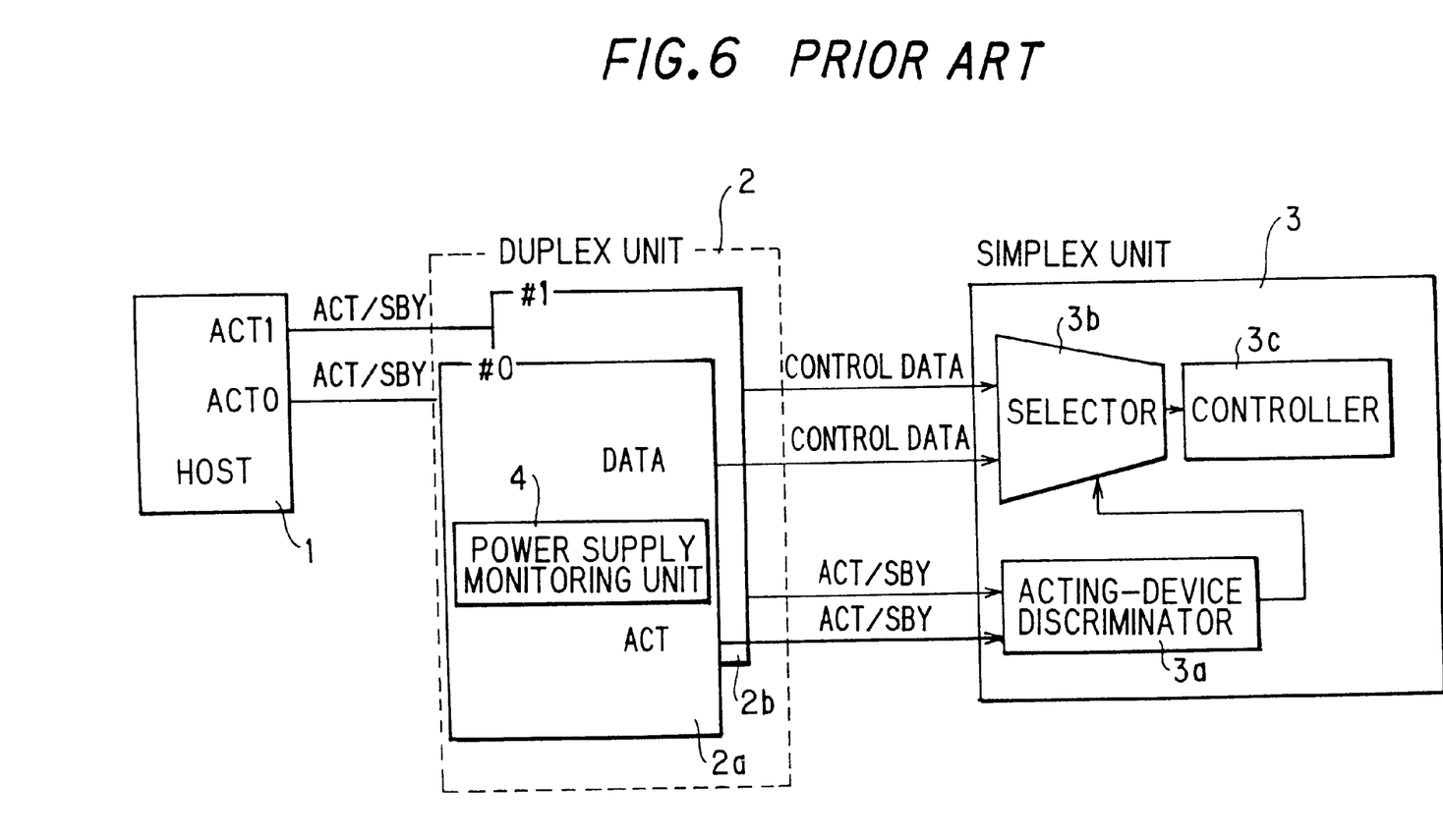
FIG. 6 is a block diagram for describing problems which arise in a duplexing system according to the prior art.

As shown in FIG. 6, a system comprises a host device 1, a duplex unit 2 and a simplex unit 3 controlled by an acting device in the duplex unit. The duplex unit 2 is composed of two devices 2a, 2b of identical construction, one device constituting an acting system (#0 system) and the other a standby system (#1 system). The duplex unit 2 is so adapted that the acting system controls the subordinate simplex unit 3 in accordance with commands from the host device 1. The acting device and standby device perform identical control and processing. When it is necessary to switch between the acting and standby devices at the time of maintenance or when the acting device is down because of failure, the standby device becomes active in response to an acting/standby changeover command from the host device 1 and is capable of continuing control of the simplex unit 3 without momentary interrupt. The simplex unit 3 has an acting-device discriminating circuit for discriminating, on the basis of an acting/standby signal that enters from each of the devices 2a, 2b, of the duplex unit 2, whether the device 2a or the device 2b is the acting system, a selector 3b for selecting and outputting control data that is output by the acting system, and a controller 3c for executing predetermined processing based upon the control data.

Each of the devices 2a, 2b constructing the duplex unit 2 has a power supply monitoring unit 4 for monitoring an interruption in power or a decline in power supply voltage in its own system. The power supply monitoring unit 4 of one device notifies the other device of an interruption in power or a decline in power supply voltage in its own system. Accordingly, when one of the devices 2a, 2b recognizes an interruption in power or a decline in power supply voltage in the other system, the device so notifies the host device 1. Upon receiving notification of an interruption in power or a decline in power supply voltage in the acting device, the host device 1 issues an acting/standby changeover signal so that the device that was serving as the standby device up to this point is made the acting device. As a result, from this point onward the controller 3c of the simplex unit 3 accepts control data via the selector 3b from the device just made the acting device and performs predetermined control.

Thus, in the conventional system as described above, the host device 1 takes the initiative in changing over the acting and standby modes of the devices 2a, 2b constructing the duplex unit 2. Consequently, when there is a decline in power supply voltage or interruption in power in the acting device, there may be instances where the acting device sends erroneous control data to the simplex unit 3 before the system changeover command based upon the decision made by the host device 1 reaches the duplex unit 2. In such case the controller 3 of the simplex unit 3 will perform control upon accepting the erroneous data, and this control may be erroneous, such as control for resetting data that has been accumulated.

Further, there are occasions where, due to noise or some other phenomenon, the devices 2a, 2b in the duplex unit 2 simultaneously send the simplex unit 3 indications that they are both acting or both standing by. In such cases the conventional simplex unit is unsure as to which of the devices 2a, 2b it should accept data from and malfunctions as a result.

In addition, there are instances where the control data from the acting device becomes corrupted owing to noise or the like, thereby causing the controller 3c of the simplex unit 3 to malfunction.

SUMMARY OF THE INVENTION

Accordingly, a first object of the present invention is to prevent malfunction in a case where an acting device develops a failure such as a decline in power supply voltage or an interruption in power, in which case the duplex unit, by its own decision and without waiting for a system changeover command from the host device, immediately makes the simplex unit believe that there has been an acting/standby changeover, whereby the simplex unit is capable of performing control upon accepting control data from the apparent acting device (actually still the device in the standby system).

A second object of the present invention is to so arrange it that erroneous data will not be accepted and a malfunction will not occur.

A third object of the present invention is to so arrange it that a malfunction will not occur even in a case where the devices constructing a duplex unit simultaneously send the simplex unit indications that they are both acting or both standing by.

In accordance with the present invention, the first object is attained by providing each of first and second devices constructing a duplex unit with a monitoring unit for monitoring failure of its own device, means for notifying the other device of a failure in its own device and active/standby notification means, wherein the active/standby notification means (1) notifies the simplex unit of the fact that its own device is acting or standing by when the device becomes the acting device or standby device in response to a command from the host device, (2) when its own device is standing by, notifies the simplex unit of the fact that its own device is now an apparent acting device owing to a failure in the other device in the acting system, and (3) when its own device is the acting device, notifies the simplex unit that its own device is now an apparent standby device owing to a failure in its own device.

In accordance with the present invention, the second object is attained by providing the simplex unit with means for reading control data, which are output by the acting device, n times, and accepting the control data in a case where the control data are identical n times.

In accordance with the present invention, the third object is attained by providing the simplex unit with a discriminator for discriminating whether first and second devices of a duplex unit are acting or standing by, and a selector for selecting and outputting control data from whichever of the first and second devices is acting, wherein when the discriminator receives notification indicating acting or notification indicating standby from active/standby notification means in both of the first and second devices simultaneously, the discriminator decides that the first and second devices are in the acting/standby state that prevailed before the notifications were received.

Other features and advantages of the present invention will be apparent from the following description taken in conjunction with the accompanying drawings.

DESCRIPTION OF THE PREFERRED EMBODIMENTS

(A) First Embodiment of the Invention

Figure 1:
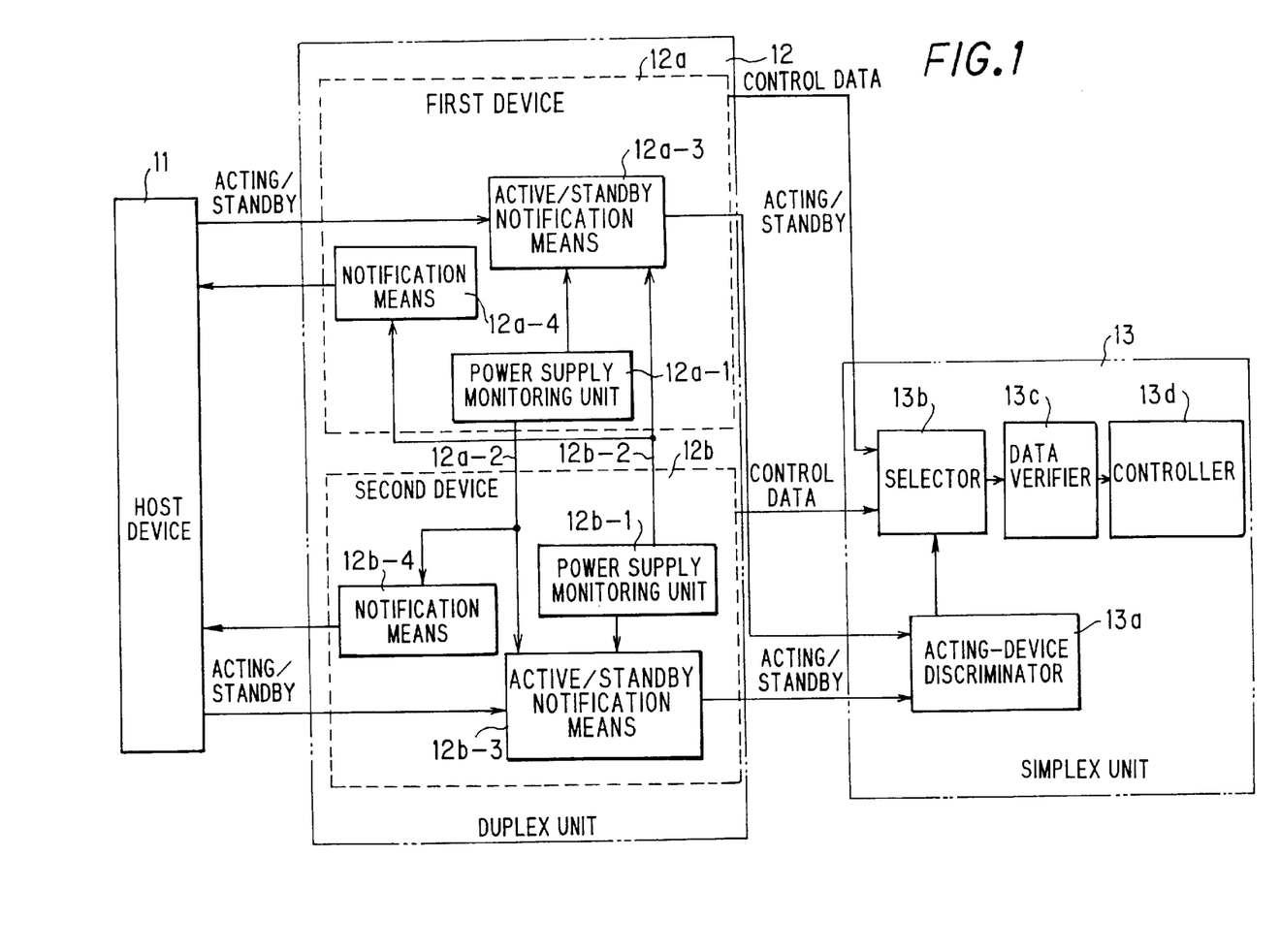
FIG. 1 is a block diagram illustrating a first embodiment of the present invention.

FIG. 1 is a block diagram illustrating the first embodiment of the invention.

Shown in FIG. 1 are a host device 11, a duplex unit 12 having identically constructed first and second devices 12a, 12b which operate as an acting device and a standby device, and a simplex unit 13 controlled by the acting device in the duplex unit. The host device 11 instructs the first and second devices 12a, 12b of the duplex unit 12 to perform an acting/standby changeover. The first and second devices 12a, 12b of the duplex unit 12 notify the simplex unit 13 of whether they are acting or standing by. On the basis of notification received, the simplex unit 13 accepts control data from the acting device and then performs predetermined control.

The first and second devices 12a, 12b of the duplex unit 12 respectively include power supply monitoring units 12a-1, 12b-1 for monitoring a voltage drop and an interruption in power in their own devices, means (notification lines) 12a-2, 12b-2 for notifying the other device of the status of the power supply voltage in their own devices, active/standby notification means 12a-3, 12b-3 for notifying the duplex unit 13 of whether they themselves are acting or standing by, and notification means 12a-4, 12b-4 for notifying the host device 11 of a voltage drop or an interruption in power in the other device.

The duplex unit 13 includes an acting-device discriminator 13a for discriminating whether the first and second devices 12a, 12b are acting or standing by, a selector 13b for selecting and outputting control data from whichever of the first and second devices 12a, 12b is acting, a data verifier 13c for reading control data, which are output by the acting device, n times, and accepting these control data in a case where the control data are identical n times, and a controller 13d for performing predetermined control based upon the control data.

Each of the active/standby notification means 12a-3, 12b-3 (1) notifies the simplex unit 13 of the fact that its own device is acting or standing by when the device becomes the acting device or standby device in response to a command from the host device 11. (2) When its own device is standing by, the active/standby notification means 12a-3 or 12b-3 notifies the simplex unit 13 immediately, without a changeover command from the host device 11, of the fact that its own device has apparently become the acting device owing to a decline in power supply voltage in the other device in the acting system. (3) When its own device is acting, the active/standby notification means 12a-3 or 12b-3 notifies the simplex unit 13 immediately, without a changeover command from the host device 11, of the fact that its own device has apparently become the standby device owing to a decline in power supply voltage in its own device.

As a result, when the power supplies of the first and second devices 12a and 12b are normal, the simplex unit 13 executes predetermined control upon accepting the control data from the acting device in accordance with the active/standby system decided by the host device 11. On the other hand, if there is a decline in power supply voltage or an interruption in power in the acting device (the first device 12a, for example), the first device 12a notifies the simplex unit 13 immediately, without a changeover command from the host device 11, of the fact that it has become the apparent standby device. Further, the standby device (the second device 12b) notifies the simplex unit 13 immediately, without a changeover command from the host device 11, of the fact that it itself has become the apparent acting device. As a result, from this point onward, the simplex unit 13 performs predetermined control upon accepting the control data sent from the apparent acting device 12b (which is the standby device when viewed from the host device). Thus, in a case where there is a decline in the power supply voltage or an interruption in power in the acting device, the simplex unit 13 is capable of performing control upon immediately accepting correct control data from the apparent acting device (actually still the standby device). In other words, even if erroneous control data are sent to the simplex unit 13 from an acting device whose power supply voltage has declined, the simplex unit 13 will not accept and process these erroneous data. This makes it possible to prevent malfunction.

The data verifier 13c reads the control data, which have been selected by the selector 13b, n (e.g., three) times and, if the read data are identical three times, accepts these control data and enters them into the controller 13d. As a result, acceptance of the control data can be delayed and the apparent active/standby changeover due to a decline in the power supply voltage or an interruption in power can be completed within the period of the time delay. Thus, malfunction owing to acceptance of control data from an acting device whose power supply voltage has declined will not occur. Further, even if the control data from the acting device are corrupted to erroneous data by the influence of noise, the controller 13d, in response to a control signal from the data verifier 13c, will not exercise control upon accepting these control data. This makes it possible to prevent malfunction due to erroneous data.

In parallel with the operation described above, the notification means of the standby device 12b notifies the host device 11 of the decline in power supply voltage or interruption of power in the acting device 12a. Upon being so notified, the host device 11 sends an active/standby changeover command to the first and second devices 12a, 12b. In response, the second device 12b, which had been standing by (had been the apparent acting device) becomes the acting device formally and the first device 12a, which had been acting (had been the apparent standby device) becomes the standby device formally.

There are instances where, because of noise or some other phenomenon, the active/standby notification means 12a-3, 12b-3 simultaneously give notification of the fact that both devices 12a, 12b are acting or that both devices 12a, 12b are standing by. In such instances the active-device discriminator 13a of the simplex unit 13 decides that the first and second devices 12a, 12b are both in the acting/standby state that prevailed before the notification was received. As a result, even notifications indicating that both devices are acting or notification indication that both devices are standing by are output, the control data can be accepted and control performed without confusion.

Figure 2:
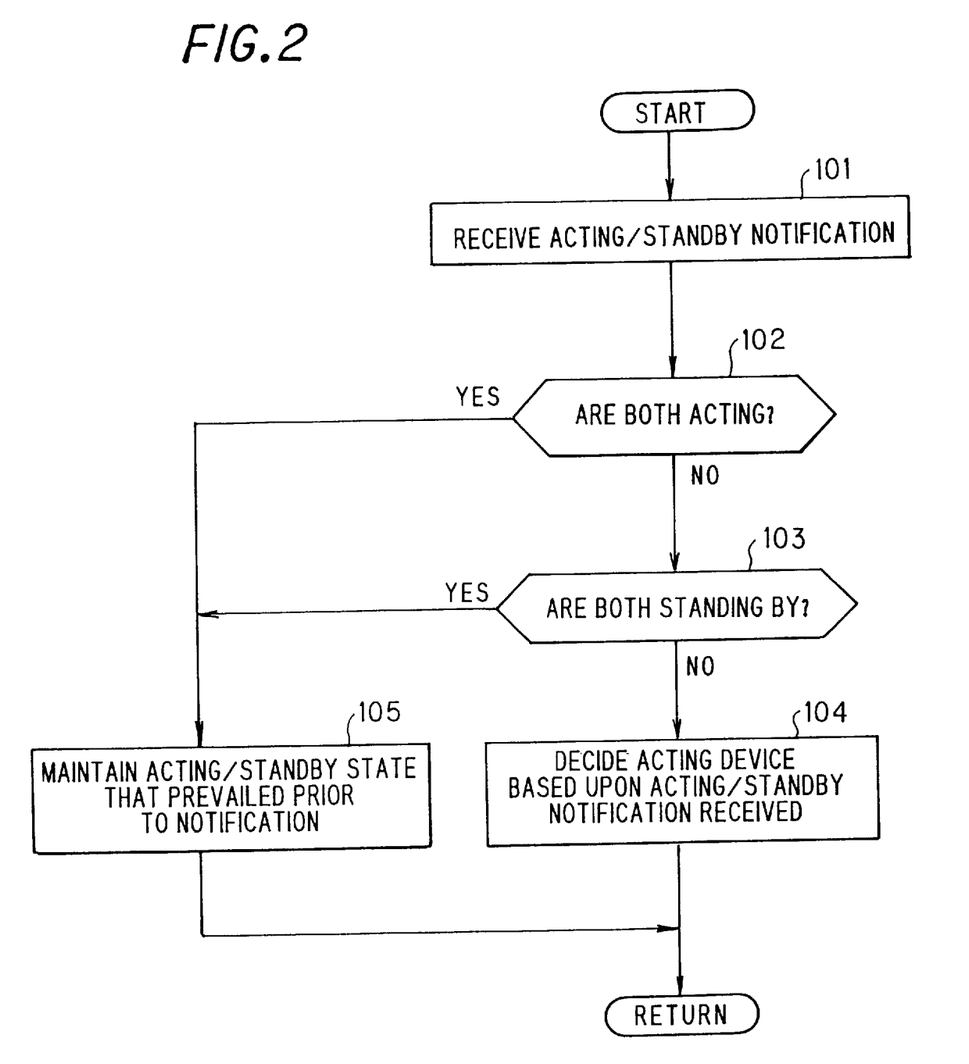
FIG. 2 is a flowchart of processing for determining which system is an acting system.

FIG. 2 is a flowchart of processing executed by the active-device discriminator 13a for determining which device is the acting device.

Acting/standby notifications are received from the first and second devices 12a, 12b of the duplex unit 12 (step 101) and it is determined whether both of the devices 12a, 12b are giving notification that they are acting or giving notification that they are standing by (steps 102, 103). Unless both devices are giving notification that they are either acting or standing by, the acting device is decided based upon the acting/standby notifications that have been received.

However, if both of the devices 12a, 12b are giving notification that they are either acting or standing by, the notifications received are deemed to be invalid and it is decided that the first and second devices 12a, 12b are both in the acting/standby state that prevailed before the notifications were received (step 105).

It should be noted that the acting-device discriminator 13a can be implemented by hardware as well.

(B) Second Embodiment of the Invention (a) Construction

Figure 3:
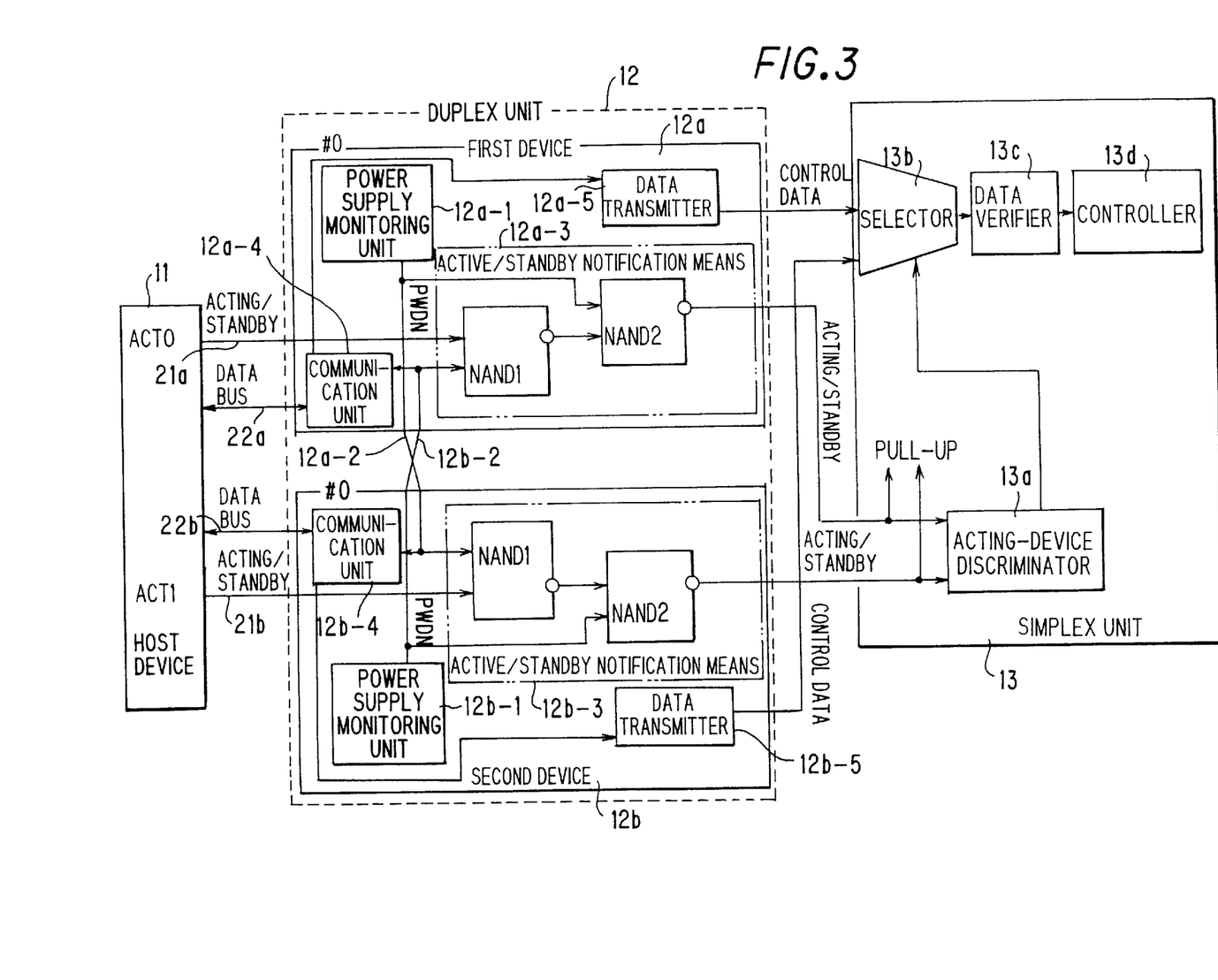
FIG. 3 is a block diagram illustrating a second embodiment of the present invention.

FIG. 3 is a block diagram illustrating a second embodiment of the present invention. Elements identical with those shown in FIG. 1 are designated by like reference characters. This arrangement differs from that of FIG. 2 in that the active/standby notification means 12a-3, 12b-3 are composed of concrete logic and in that the communication paths of the control data are clarified.

Shown in FIG. 3 are the host device 11, the duplex unit 12 having the identically constructed first and second devices 12a, 12b which operate as an acting system and a standby system, the simplex unit 13 controlled by the acting device in the duplex unit, control signal lines 21a, 21b for transmitting acting/standby changeover signals from the host device 11 to the first and second devices 12a, 12b of the duplex unit 12, and data buses 22a, 22b via which data are sent back and forth between the host device 11 and the first and second devices 12a, 12b.

The first and second devices 12a, 12b of the duplex unit 12 respectively include the power supply monitoring units 12a-1, 12b-1 for monitoring a voltage drop in their own devices, the means (notification lines) 12a-2, 12b-2 for notifying the other device of the status of the power supply voltage in their own devices, the active/standby notification means 12a-3, 12b-3 for notifying the duplex unit 13 of the whether they themselves are acting or standing by, communication means 12a-4, 12b-4 for sending data to and receiving data from the host device 11 via the data buses, and data transmitters 12a-5, 12b-5 for sending the simplex unit 13 control data that has been sent from the host device 11.

The active/standby notification means 12a-3, 12b-3 have first and second two-input NAND gates NAND1, NAND2, respectively. An acting/standby signal ("0" indicating acting and "1" indicating standby) output by the host device 11 and an output signal PWDN ("0" indicating a decline in power or a power interruption and "1" indicating that the power supply is normal) output by the power supply monitoring unit of the other device enter the first NAND gate NAND1. The output signal of the first NAND gate NAND1 and an output signal PWDN ("0" indicating a decline in power or a power interruption and "1" indicating that the power supply is normal) from the power supply monitoring unit of its own device enter the second NAND gate NAND2.

If the power supplies of the first and second devices 12a, 12b are normal when the first device 12a is acting and the second device 12b is standing by, the output of the second NAND gate NAND2 of the first device 12a becomes "0", thereby notifying the simplex unit 13 that the first device 12a is acting. Further, the output of the second NAND gate NAND2 of the second device 12b becomes "1", thereby notifying the simplex unit 13 that the second device 12b is standing by.

If, when the first device 12a is acting and the second device 12b is standing by, the power supply voltage of the acting first device 12a drops or is interrupted, the output of the second NAND gate NAND2 of the first device 12a becomes "1", thereby notifying the simplex unit 13 that the first device 12a is apparently standing by. Further, the output of the second NAND gate NAND2 of the second device 12a becomes "0", thereby notifying the simplex unit 13 that the second device 12b is apparently acting.

(b) Operation

If the power supplies of the first and second devices 12a, 12b are normal when the first device 12a is acting and the second device 12b is standing by, the active/standby notification means 12a-3 of the first device 12a notifies the simplex unit 13 that the first device 12a is acting and the active/standby notification means 12b-3 of the second device 12b notifies the simplex unit 13 that the second device 12b is standing by. Under these conditions, the host device 11 sends control data to both devices via the data buses 22a, 22b. The communication units 12a-4, 12b-4 of the respective devices enter the received control data into the data transmitters 12a-5, 12b-5, respectively. Each of the data transmitters 12a-5, 12b-5 stores the control data in an internal buffer, subjects the control data to a parallel-to-serial conversion and transmits the converted data to the simplex unit 13 repeatedly in the form of a bit serial. The selector 13b of the simplex unit 13 selects the control data sent from the acting device 12a and enters the selected control data into the data verifier 13c. If the control data coincide three consecutive times, the data verifier 13c enters the control data into the controller 13d and the latter performs predetermined control based upon the control data.

If the power supply voltage of the acting device 12a drops or if power is interrupted in the acting/standby state, the output signal PWDN of the power supply monitoring unit 12a-1 becomes logical "0". As a result, the active/standby notification means 12a-3 of the first device 12a notifies the simplex unit 13 of the fact that the first device 12a is apparently standing by and the active/standby notification means 12b-3 of the second device 12b notifies the simplex unit 13 of the fact that the second device 12b is apparently acting. As a result, the selector 13b of the simplex unit 13 selects the control data sent from the apparently acting device 12b and enters the selected control data into the data verifier 13c. If the control data coincide three consecutive times, the data verifier 13c enters the control data into the controller 13d and the latter performs predetermined control based upon the control data.

In parallel with the operation described above, the communication unit 12b-4 of the standby device 12b notifies the host device 11 of the decline in power supply voltage or interruption of power in the acting device 12a. Upon being so notified, the host device 11 sends an active/standby changeover command to the first and second devices 12a, 12b. In response, the second device 12b standing by until now (i.e., serving as the apparent acting system until now) becomes the acting system formally, and the first device 12a acting until now (i.e., serving as the apparent standby system until now) becomes the standby system formally.

(C) System to which the Invention can be Applied

Figure 4:
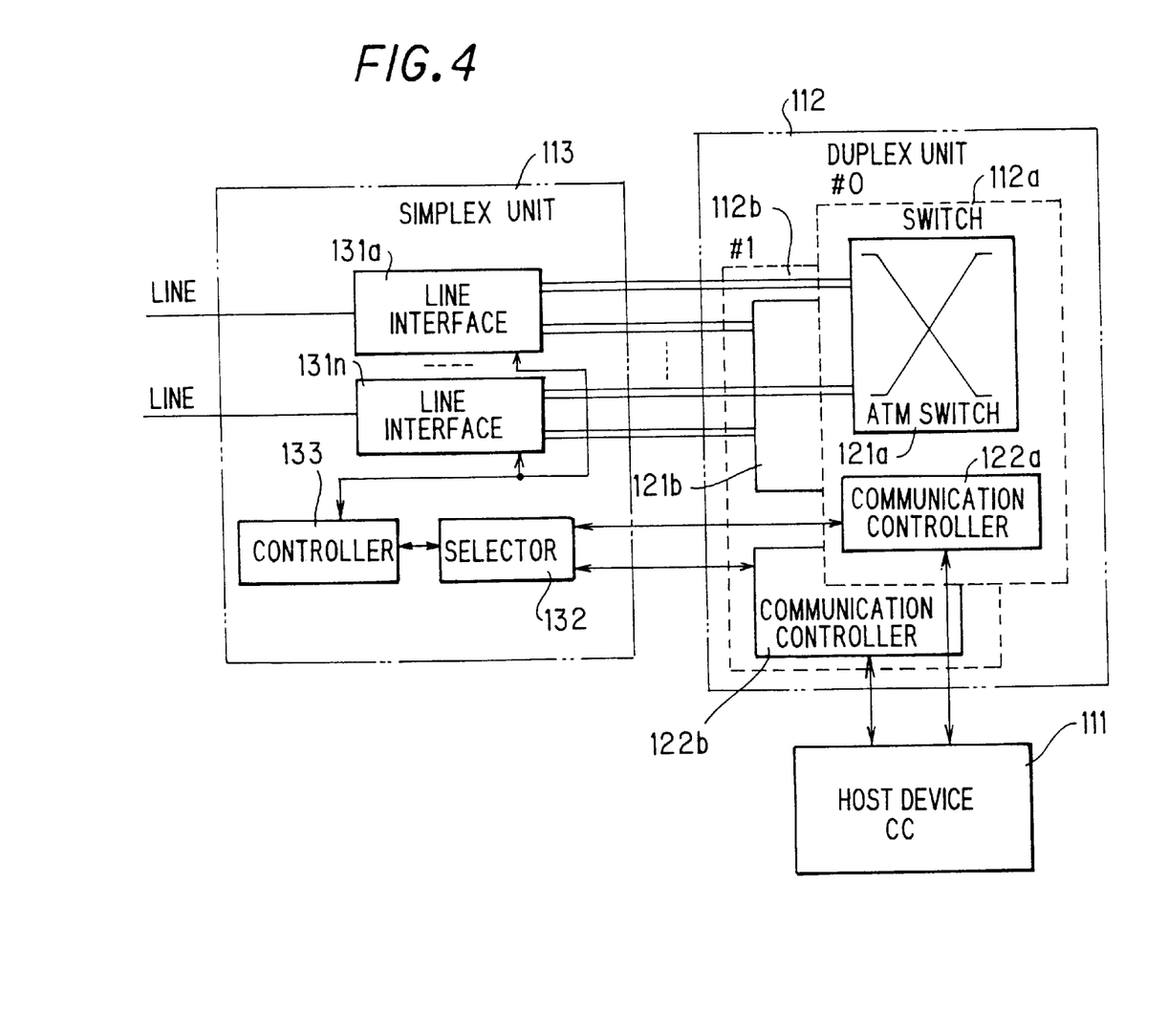
FIG. 4 is a block diagram of an ATM switch to which the invention is applicable.

FIG. 4 is a block diagram illustrating an ATM switch to which the present invention can be applied. Only the control data communication paths and line paths are shown. The system includes a host device 111, a duplex unit 112 having first and second switches 112a, 112b which operate as an acting system and a standby system, and a simplex unit 113 having a number of line interfaces. The first and second switches 112a, 112b of the duplex unit 112 have ATM switches 121a, 121b and communication controllers 122a, 122b, respectively. The simplex unit 113 has a number of line interfaces 131a–131n, a selector 132 for selecting data sent from the acting switch, and a controller 133 for collecting billing data, setting path establishing information and controlling the line interfaces in accordance with the indication given by control data sent from the host device 111.

Figure 5:
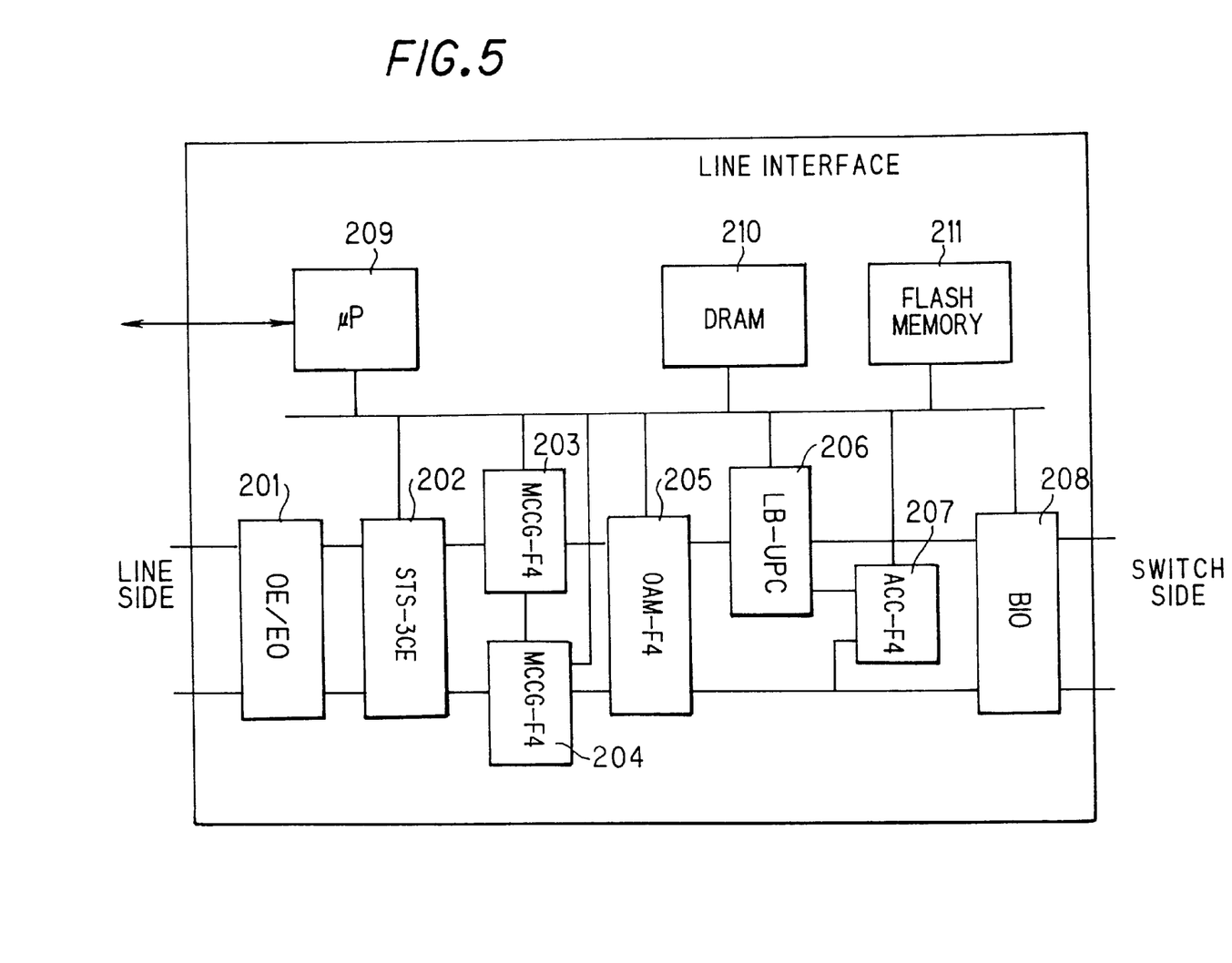
FIG. 5 is a block diagram of a line interface.

The line interfaces 131a–131n have the construction shown in FIG. 5. Each line interface includes an optical interface 201 connected to a line consisting of optical fiber and having an opto-electric converting circuit (O/E) and an electro-optic converting circuit (E/O). A SONET terminal/ATM cell converter 202 extracts an ATM cell and converts the cell to the cell format within the switch by achieving cell synchronization from the payload of a SONET frame using an HEC (Header Error Control) byte. Conversely, the converter 202 converts the cell format that has entered from the switch side to an ATM cell format, effects mapping to the payload of the SONET frame and sends the result to the line side. ATM layer performance management units (MCCG) 203, 204 manage the degree to which the performance of the subscriber lines deteriorates. These collect PM data such as (1) the number of error cells, (2) the number of lost information cells and (3) the number of mis-inserted user information cells. An OAM cell processor 205 executes processing to insert and extract OAM (Operation and Maintenance) cells for maintenance management.

A cell flow controller (UPC) 206 functions to prevent cells of an abnormal amount greater than a prescribed band (these are referred to as illegal cells) from flowing into the switch through the line because of line failure or some other problem. Cell inflow control that does not allow switch congestion is referred to as UPC (Usage Parameter Control) or NPC (Network Parameter Control). By virtue of such control, the cell flow controller 206 collects NDC data such as (1) the number of input cells or number of output cells of every cell having a different VP value or VPI/VCI value, and (2) the number of discarded input cells of every VPI value or VPI/VCI value or the number of discarded input cells of cell loss priority CLP=0.

A billing processor 207 performs billing in cell units. Specifically, the billing processor 207 functions to measure the flow rate of passing cells in order to perform billing on a per-cell basis. The measurement of the flow rate of passing cells is performed for every cell having a different VPI value or different VPI/VCI value. From among cells that have entered from the redundant switch side, a switch-side interface 208 selects cells that arrive from the acting system. Another function of the switch-side interface 208 is to output cells, which have entered from the line side, to respective ones of the redundant switches. The line interface further includes a microprocessor 209 for controlling the overall line interface, a memory (DRAM) 210 serving as a working area of the microprocessor and as a store of data, and a flash memory 211 for storing a booting program.

These units are interconnected by a bus. The microprocessor 209 receives commands from the host device 111 via the controller 133 (see FIG. 4) and is adapted to (1) perform control for looping back test cells, (2) perform control (traffic control) for collecting and giving notification of traffic data such as billing information, and (3) to perform warning monitoring control based upon OAM cells.

Thus, in accordance with the present invention, each of first and second devices constructing a duplex unit is provided with a power supply monitoring unit for monitoring failure, e.g. a decline in power supply voltage, in its own device, means for notifying the other device of a failure, e.g. a decline in power supply voltage, in its own device and active/standby notification means. (1) The active/standby notification means notifies a simplex unit of the fact that its own device is acting or standing by when the device becomes the acting device or standby device in response to a command from the host device. (2) Owing to a failure in the acting other device when its own device is standing by, the active/standby notification means notifies the simplex unit of the fact that its own device is now the apparent acting device. (3) Owing to a failure in its own device when its own device is acting, the active/standby notification means notifies the simplex unit that its own device is now the apparent standby device. As a result, when the acting device develops a failure, it is possible to prevent malfunction because the duplex unit, by its own decision and without waiting for a system changeover command from the host device, immediately makes the simplex unit believe that there has been an active/standby changeover, whereby the simplex unit is capable of performing control upon accepting control data from the apparent acting device (actually still the standby device). This makes it possible to prevent malfunction when a failure develops in the acting device.

Further, in accordance with the invention, each of first and second devices constructing a duplex unit is provided with means for notifying a host device of a failure in the other device. Upon being notified of failure of an acting device, the host device formally performs an active/standby changeover of the first and second devices. As a result, even if an apparent active/standby changeover is made in the duplex unit owing to a failure in the acting device, the system changeover operation under the initiative of the host device can be preserved.

Further, in accordance with the invention, means are provided for reading control data, which are output by the acting device, n times, and accepting these control data if the data are identical n times. As a result, acceptance of the control data can be delayed and the apparent active/standby changeover due to a failure can be completed within the period of the time delay. Thus, malfunction owing to acceptance of control data from an acting device that has failed will not occur. Further, even if the control data from the acting device are corrupted to erroneous data as by the influence of noise, control will not be performed upon accepting these data. This makes it possible to prevent malfunction due to erroneous data.

Further, in accordance with the invention, a simplex unit is provided with a discriminator for discriminating whether first and second devices of a duplex unit are acting or standing by, and a selector for selecting and outputting control data from whichever of the first and second devices is acting. When the discriminator receives notification indicating acting or notification indicating standby from the first and second devices simultaneously, the discriminator decides that the first and second devices are in the acting/standby state that prevailed before the notifications were received. As a result, even if, because of noise or some other problem, the devices constructing a duplex unit simultaneously send the simplex unit indications that they are both acting or both standing by, the simplex unit will not malfunction.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for preventing malfunction when a failure occurs in a system including a host, a duplex unit having first and second devices which operate as an acting device and a standby device, and a simplex unit controlled by the acting device of the duplex unit, the host in normal operation instructing the first and second devices of the duplex unit to perform an acting/standby changeover, the first and second devices of the duplex unit notifying the simplex unit of whether they are acting or standing by, and the simplex unit accepting control data from the acting device and performing predetermined control, wherein said apparatus includes, in each of said first and second devices:

a monitoring unit for monitoring failure in its own device;

means for notifying the other device of a failure in its own device; and active/standby notification means for notifying the simplex unit of the fact that its own device is acting or standing by when the device becomes the acting device or standby device in response to a command from the host, for notifying the simplex unit of the fact that its own device is now an apparent acting device owing to a failure in the other device when its own device is standing by, and for notifying the simplex unit of the fact that its own device is now an apparent standby device owing to a failure in its own device when its own device is acting.

2. The apparatus according to claim 1, wherein said active/standby notification means includes:

a first NAND gate to which an acting/standby command signal from the host and a failure notification signal from the other device are input; and a second NAND gate to which a failure detection signal indicative of failure in its own device and an output from said first NAND gate are input;

said simplex unit being given notification of acting/standby by an output from said second NAND gate.

3. The apparatus according to claim 1, wherein said monitoring unit senses a decline in power supply voltage as a failure.

4. The apparatus according to claim 1, further comprising means in each of the first and second devices for notifying the host of a failure in the other device;

said host performing a formal acting/standby changeover of said first and second devices when it is notified of a failure in the acting device.

5. The apparatus according to claim 1, further comprising in said simplex unit:

a discriminator for discriminating whether said first and second devices are acting or standing by; and a selector for selecting and outputting control data from whichever of said first and second devices is acting.

6. The apparatus according to claim 5, wherein when said discriminator receives notification indicating acting or notification indicating standby from said first and second devices simultaneously, said discriminator decides that said first and second devices are in the acting/standby state that prevailed before the notifications were received.

7. The apparatus according to claim 5, further comprising means connected to an output side of said selector for reading control data, which are outputted by the acting device, n times, and accepting said control data if the control data are identical n times.

* * * * *